US005572022A

United States Patent [19]

Schwartz et al.

[11] Patent Number: 5,572,022

[45] Date of Patent: Nov. 5, 1996

[54] METHOD AND APPARATUS OF INCREASING DYNAMIC RANGE AND SENSITIVITY OF A MASS SPECTROMETER

[75] Inventors: Jae C. Schwartz, San Jose; Xaio-Guang Zhou, Fremont; Mark E. Bier, Menlo Park, all of Calif.

[73] Assignee: Finnigan Corporation, San Jose, Calif.

[21] Appl. No.: 398,143

[22] Filed: Mar. 3, 1995

[51] Int. Cl.[6] .............................. H01J 49/00; B01D 59/44

[52] U.S. Cl. .............................................. 250/282; 250/292

[58] Field of Search .................................... 250/282, 292, 250/423 R

[56] References Cited

U.S. PATENT DOCUMENTS

| | | | |
|---|---|---|---|
| Re. 34,000 | 7/1992 | Syka et al. | 250/292 |
| 2,939,952 | 6/1960 | Paul et al. | 250/41.9 |
| 3,527,939 | 9/1970 | Dawson et al. | 250/41.9 |
| 3,742,212 | 6/1973 | McIver, Jr. | 250/41.9 |
| 4,540,884 | 9/1985 | Stafford et al. | 250/292 |
| 4,736,101 | 4/1988 | Syka et al. | 250/292 |
| 5,107,109 | 4/1992 | Stafford | 250/282 |
| 5,206,507 | 4/1993 | Kelley | 250/282 |
| 5,285,063 | 2/1994 | Schwartz et al. | 250/282 |
| 5,420,425 | 5/1995 | Bier et al. | 250/292 |

*Primary Examiner*—Bruce C. Anderson
*Attorney, Agent, or Firm*—Flehr, Hohbach, Test, Albritton & Herbert

[57] ABSTRACT

This invention is directed to a method and apparatus of increasing the dynamic range and sensitivity of an ion trap mass spectrometer with the use of external ionization. An increased number of sample ions are introduced into the mass spectrometer for mass analysis with the aid of an automatic ion supply control, or feedback, feature. The feedback portion of the invention controls the gating time, and hence the number of sample ions gated into the mass spectrometer, based on previous measurements of the ion content in the mass spectrometer to gate an amount relative to where space charge and saturation begins. A mass filter may also be used between the ion source and the mass spectrometer to improve the signal-to-noise ratio and increase the net processing time. This mass analyzing system may be used with various methods of mass analysis including mass selective instability, resonance ejection, MS/MS, and MS/MS with a supplemental AC field.

10 Claims, 8 Drawing Sheets

METHOD AND APPARATUS OF INCREASING DYNAMIC RANGE AND SENSITIVITY OF A MASS SPECTROMETER

This is a continuation of the application filed on or about Mar. 2, 1995, for which the serial number is as yet unknown, for a Method and Apparatus of Increasing Dynamic Range and Sensitivity of a Mass Spectrometer.

BRIEF SUMMARY OF THE INVENTION

This invention is directed to a method and apparatus of increasing the dynamic range and sensitivity of a quadrupole ion trap mass spectrometer while minimizing space charge effects and saturation with the use of external ionization and an automatic ion supply control feature.

BACKGROUND OF THE INVENTION

An ion trap mass spectrometer is described in Paul et al. U.S. Pat. No. 2,939,952. In general, an electrode structure provides an ion storage trap region where a substantially quadrupole field traps and stores ions. Ion trap mass spectrometers are also described in Dawson et al. U.S. Pat. No. 3,527,939; McIver U.S. Pat. No. 3,742,212; McIver et al. U.S. Pat. No. 4,104,917; and Stafford et al. U.S. Pat. No. 4,540,884.

Ion traps are devices in which ions are introduced into or formed and contained within a trapping chamber formed by at least two electrode structures by means of substantially quadrupolar electrostatic fields generated by applying RF voltages, DC voltages or a combination thereof to the electrodes. To form a substantially quadrupole field, the electrode shapes have typically been hyperbolic.

Mass storage and analysis are generally achieved by operating the ion trap electrodes with values of RF voltage V, RF frequency f, DC voltage U, and device size $r_0$ such that ions having their mass-to-charge ratios (m/e) within a finite range are stably trapped inside the device. The aforementioned parameters are sometimes referred to as trapping or scanning parameters and have a relationship to the m/e ratios of the trapped ions.

Quadrupole devices are dynamic. Instead of constant forces acting on ions, ion trajectories are defined by a set of time-dependent forces. As a result, an ion is subject to strong focusing in which the restoring force, which drives the ion back toward the center of the device, increases linearly as the ion deviates from the center. For two-dimensional ion trap mass spectrometers, the restoring force drives the ion back toward the center axis of the device.

Motion of ions in quadrupole fields is described mathematically by the solutions to a particular second-order linear differential equation called the Mathieu equation. Solutions are developed for the general case, the two-dimensional case of the quadrupole mass filter, and the standard three-dimensional case of the quadrupole ion trap. Thus, in general, for any direction u where u represents x, y, or z, $$a_u = \frac{K_a e U}{m r_0^2 \omega^2}$$

$$q_u = \frac{K_q e V}{m r_0^2 \omega^2}$$

where

V=magnitude of radio frequency (RF) voltage

U=amplitude of applied direct current (d.c.) voltage e=charge on an ion m=mass of an ion $r_0$=device-dependent size $\omega=\pi f$ f=frequency of RF voltage $K_a$=device-dependent constant for $a_u$ $K_q$=device-dependent constant for $q_u$ Stability diagrams which represent a graphical illustration of the solutions of the Mathieu equation use $a_u$ as the ordinate and $q_u$ as the abscissa.

For a substantially quadrupole field defined by U, V, $r_0$ and $\omega$ the locus of all possible m/e ratios maps onto the stability diagram as a single straight line running through the origin with a slope equal to −2 U/V. This locus is also referred to as the scan operating line. For ion traps, the portion of the locus that maps within the stability region defines the range of ions that are trapped by the applied field.

FIG. 3 shows a stability diagram representative of the operation of a three-dimensional ion trap mass spectrometer. Knowledge of the diagram is important to the understanding of the operation of quadrupole ion trap mass spectrometers. The stable region is shown bounded by $\beta_x$=0, $\beta_x$=1.0, $\beta_y$=0, and $\beta_y$=1.0.

The ion masses that can be trapped depend on the numerical values of the trapping parameters U, V, $r_0$, and $\omega$. The relationship of the trapping parameters to the m/e ratio of the ions that are trapped is described in terms of the parameters "a" and "q" in FIG. 1. The type of trajectory a charged ion has in a quadrupole field depends on how the specific m/e ratio of the ion and the applied trapping parameters, U, V, $r_0$ and $\omega$ combine to map onto the stability diagram. If these trapping parameters combine to map inside the stability envelope then the given ion has a stable trajectory in the defined field.

By properly choosing the magnitudes of U and V, the range of specific masses of trappable ions can be selected. If the ratio of U to V is chosen so that the locus of possible specific masses maps through an apex of the stability region, then only ions within a very narrow range of specific masses will have stable trajectories. However, if the ratio of U to V is chosen so that the locus of possible specific masses maps through the "middle" ($a_u$=0) of the stability region, then ions of a broad range of specific masses will have stable trajectories.

Ions having a stable trajectory in a substantially quadrupole field are constrained to an orbit about the center of the field. Typically, the center of the field is substantially along the center of the trapping chamber.

This invention is used with several known methods of mass analysis. One method is mass selective instability scan. One embodiment of this method is described in U.S. Pat. No. 4,540,884, which is incorporated herein by reference. In this method, a wide mass range of ions of interest is created and stored in the ion trap during an ionization step. The RF voltage applied to the ring electrode of the substantially quadrupole ion trap is then increased and trapped ions of increasing specific masses become unstable and either exit the ion trap or collide on the electrodes. The ions that exit the ion trap can be detected to provide an output signal indicative of the m/e (mass to charge ratio) of the stored ions and the number of ions.

Another method of mass analysis is an enhanced form of the mass selective instability scan which incorporates resonance ejection. Refer to U.S. Pat. Nos. 4,736,101 and RE34,000. They demonstrate that introducing a supplemental AC field in the ion trap mass spectrometer facilitates the separation and ejection of adjacent m/e ions. The frequency $f_{res}$ of the supplemental AC source determines the $q_u$ at which ions will be ejected. If the frequency $f_{res}$ of the supplemental AC field matches a secular component frequency of motion of one of the m/e ion species in the ion occupied volume, the supplemental field causes those specific ions (e.g., those ions at the specific q) to oscillate with increased amplitude. The magnitude of the supplemental field determines the rate of increase of the ion oscillation. Small magnitudes of the supplemental field will resonantly excite ions, but they will remain within the substantially quadrupole field. Large magnitudes of the supplemental field will cause those ions with the selected resonant frequency to be ejected from or onto the trapping chamber. In some commercial ion traps, a value of 2 to 10 volts peak-to-peak measured differentially between the two end caps have been used to resonantly eject ions.

The frequency of the supplemental AC field $f_{res}$ is selected such that the ions of specific m/e ratios can develop trajectories that will make the ion leave the ion occupied volume. The resonant frequency $f_{res}=kf \pm f_u$ where, k=integer where $k=\{0, \pm 1, \pm 2, \pm 3, \ldots\}$ f=frequency of the RF component of the substantially quadrupole field $f_u$=fundamental frequency for the secular motion of a given ion at $q_{u\ eject}$ along the u coordinate axis, and $f_u<f$.

The expression for $f_{res}$ represents the frequency components of the solutions of the exact equations of ion motion in a harmonic RF potential. Typically, k=0 so that $f_{res}=f_u$ and smaller applied AC amplitude potentials are required; however, any frequency satisfying the general expression for $f_{res}$ and of sufficient amplitude will cause ions to leave the trapping chamber.

A third method of mass analysis is the use of a supplemental field with the MS/MS method, described in U.S. Pat. Nos. 4,736,101 and RE34,000, which are incorporated herein by reference. Essentially, MS/MS involves the use of at least two distinct mass analysis steps. First, a desired m/e is isolated (typically with a mass window of ±0.5 amu). Ejection of undesired ions during the isolation step is accomplished by, and not limited to, several techniques: (i) applying DC to the ring, (ii) applying an RF electric field with a supplemental AC field, and (iii) scanning the RF so that undesirable ions pass through and are ejected by a resonance frequency. This is $MS^1$. After undesired ions are ejected, the RF (and possibly DC) voltage is lowered to readjust the m/e range of interest to include lower m/e ions. Fragments, or product ions can then be formed when a neutral gas, such as helium, argon, or xenon, is introduced in the ion trapping chamber in combination with a resonance excitation potential applied to the end caps. These fragments remain in the ion trapping chamber. In the second mass analysis step, the mass selective instability scan is used, with or without resonance ejection, to eject the fragment ions into a detector. This is $MS^2$. Thus, at least two mass spectrometry steps were performed in one device. Repetitive tandem MS techniques (i.e. $(MS)^n$) may also be employed for n distinct mass spectrometry steps.

The $MS^2$ step can be accomplished as follows: A supplemental AC field is applied after the primary RF field is decreased at the end of the first scan and prior to the second scan to eject undesired ions of a specific m/e ratio. Upon ejection, the supplemental AC field is turned off and the primary RF field is increased to eject desired ions into a detector. Variations of this technique, as disclosed in U.S. Pat. Nos. 4,736,101 and RE34,000, can be used. Thus, manipulation of the RF amplitude, RF frequency, supplemental AC field amplitude, supplemental AC field frequency, or a combination thereof promotes ejection of ions for detection after the formation and trapping of product ions. For example, the supplemental AC field can be turned on during the second scan of the primary RF field. Alternatively, instead of a second scan period, the RF field is kept constant while the frequency of the supplemental AC field is varied. Ejection can also be achieved by changing the magnitude of the supplemental AC field while changing the amplitude of the RF component of the substantially quadrupole field.

When operating a mass spectrometer, the amount of ions entering the ion trap for analysis varies. In the prior art the ionization times have remained relatively constant. Thus, when the amount of ions exceeds a certain threshold level, sample saturation and space charge effects may result in the loss of mass resolution and sensitivity and errors in mass assignment.

Space charge is the perturbation in an electrostatic field due to the presence of an ion or ions. This perturbation forces the ion to follow trajectories not predicted by the applied field. If the perturbation is great, the ion may be lost and/or the mass spectral quality may degrade. Spectral degradation refers to broad peaks giving lower resolution (m/Δm), a loss of peak height reducing the signal-to-noise ratio, and/or a change in the measured relative ion abundances. Space charge thus limits the number of ions one can store while still maintaining useful resolution and detection limits.

To minimize the effects of space charge, increase the dynamic range, increase sensitivity, and improve detection limits, an automatic ion supply control feature may be used to control the number of ions introduced into the mass spectrometer. Thus, in a simplified illustration, ions are initially introduced into the mass spectrometer by "turning on" a focusing lens system to gate ions. The ions are trapped in the mass spectrometer by a substantially quadrupole field. Total ion content is then measured by collecting and processing ejected ions. A computer, through an algorithm, assesses the total ion content and determines how many additional ions, if any, should be formed in the mass spectrometer and still be below the space charge level but above the lower level detection limit. This total ion content information is then used to calculate a new gate time. The focusing lens system turns on for a length of time equal to this new gate time to gate a substantially optimum number of ions into the mass spectrometer.

Various external ionization methods may be employed in this invention. A representative, and not exhaustive, list of ionization methods include electron impact ionization (EI), chemical ionization (CI), field ionization/desorption, photon impact, fast atom bombardment (FAB), electrospray ionization, and thermospray ionization, atmospheric pressure ionization (API), atmospheric pressure chemical ionization (APCI), particle beam liquid chromatography, and supercritical fluid chromatography. These ionization methods are well-known by their names alone and are well represented in the literature.

U.S. Pat. No. 5,107,109, assigned to Finnigan Corporation, shows one application of feedback for mass spectrometers. However, this particular patent uses feedback for internal ionization. External ionization, through its many techniques, has been an effective and popular means of introducing ions into mass spectrometers because of its many benefits, including minimizing ion-molecule reactions. Several embodiments of the invention, as claimed and disclosed in this patent application, shows the use of feedback for external ionization. For those cases where external ionization is employed in mass analysis, the present invention, through its embodiments, provides an effective means of obtaining improved performance in mass spectrometer systems.

SUMMARY OF THE INVENTION

An object of this invention is to improve the performance of a mass analyzing system which automatically controls the amount of ions gated into the mass spectrometer.

Another object of the invention is to use this mass analyzing system with external ionization, including all types of external ionization methods.

A further object of the invention is to use this mass analyzing system with all types of mass analyzing ejection techniques including mass selective instability scan, MS/MS, and a supplementary AC resonance ejection field.

Still another object of this invention is to use the method disclosed herein with mass spectrometers with novel geometries.

This invention, through its embodiments, achieves these and other objects by providing a mass analyzing system and method incorporating an automatic ion supply control feature, or feedback, for improved performance. The improved performance includes increased dynamic range, increased sensitivity, improved lower detection limit, and reduction of space charge effects. One embodiment of the apparatus comprises an ion source from which ions are gated into a mass spectrometer for mass analysis with a feedback feature which controls the number of sample ions gated into the mass spectrometer; thus, one measurement of the total ion content in the mass spectrometer determines the gate time for the next ion introduction step. This minimizes saturation and space charge in the mass spectrometer.

DETAILED DESCRIPTION OF PREFERRED EMBODIMENTS

Figure 1:
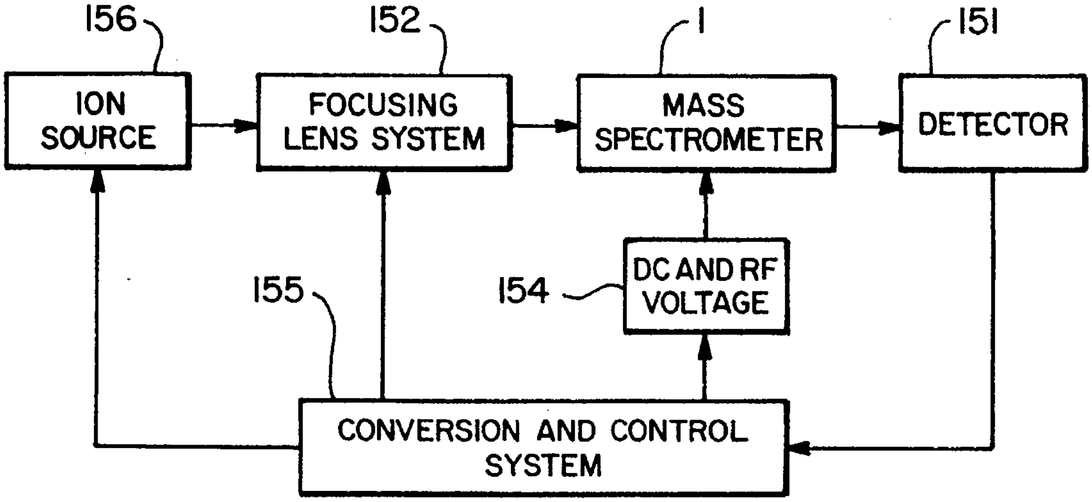
FIG. 1 is a block diagram of an embodiment of the invention.

An embodiment of the invention is shown in FIG. 1. An ion source 156 forms sample ions. This invention is not limited to any particular technique of forming sample ions since numerous techniques may be employed. A portion of the sample ions are gated into mass spectrometer 1 by focusing lens system 152. Depending on the control signals sent by conversion and control system 155, the focusing lens system 152 will be set at a particular set of voltages for a specific period of time to gate an approximate number of sample ions into the mass spectrometer 1.

The conversion and control system 155 applies control signals to DC and RF voltage source 154 to apply an appropriate set of voltages (or only the RF voltage) to the mass spectrometer 1 to form a substantially quadrupole field in the mass spectrometer 1. The substantially quadrupole field stores sample ions gated into the mass spectrometer for further processing. Changes in the substantially quadrupole field may render some or all sample ions unstable and leave the mass spectrometer into the detector 151. The ion current formed by the collection of sample ions in the detector 151 may be converted to a more useful signal representation, such as a digital representation of voltage. This conversion occurs in the conversion and control system 155.

An algorithm in the conversion and control system 155 determines the total ion content of the mass spectrometer based on the recently detected amount and can calculate a substantially optimum number of sample ions that should be trapped in the mass spectrometer 1 for further analysis. This substantially optimum number is based on reducing effects from space charge and saturation of the mass spectrometer. Based on the calculation, the conversion and control system 155 sends control signals to the focusing lens system 152 to "open" the gate for a certain length of time to gate only a pre-determined number of sample ions into the mass spectrometer 1. These substantially optimum number of sample ions may now be mass analyzed. Thus, a total ion content information front the initial sample is used to gate a new and more optimum number of sample ions in the next gating sequence.

Figure 2A:
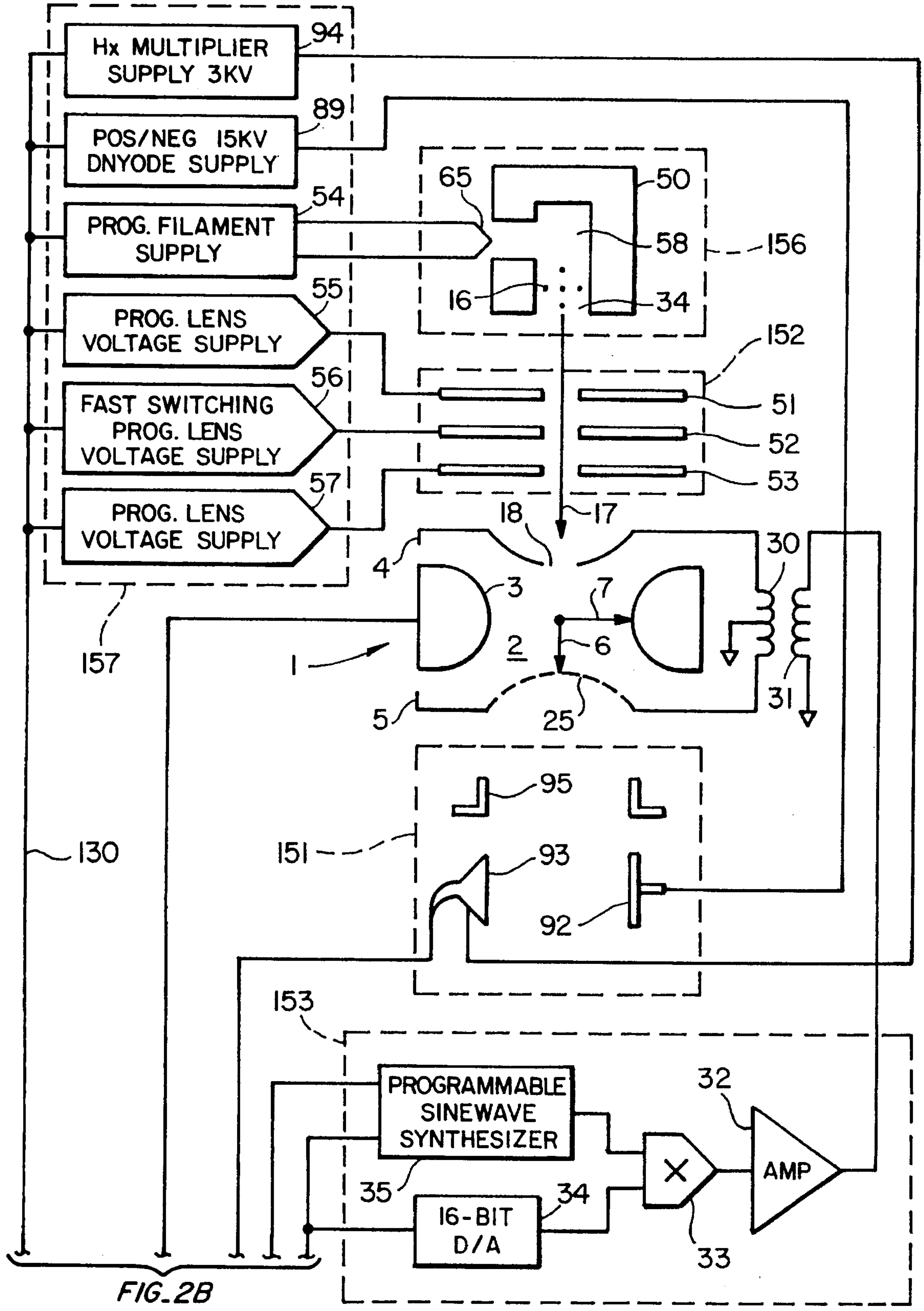
FIG. 2 is a circuit diagram of an embodiment of the mass analyzing system.
Figures 2A, 2B:
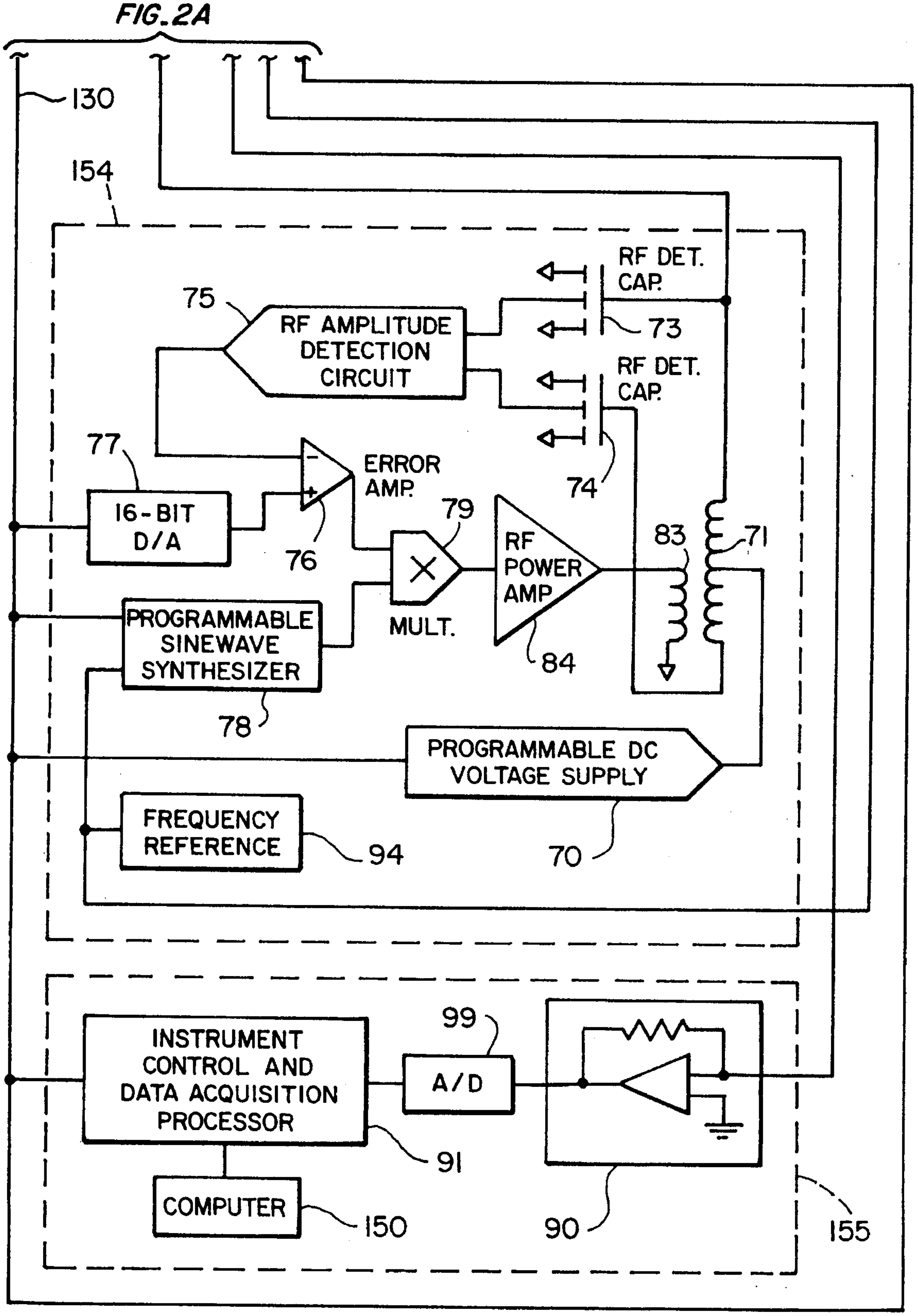

A circuit diagram describing an embodiment of the invention is shown in FIG. 2. An ion source 156 forms sample ions. Here, as an example, the ion source uses electron impact ionization to form ions. However, other ionization methods may be employed with the invention. In some embodiments these ion sources are continuous; that is, ions are formed continuously.

Normally, the sample ions originate under low pressure conditions such as $1\times10^{-3}$ torr. Other techniques involve ionizing sample molecules at elevated pressures of, for example, greater than $1\times10^{-2}$ torr. The higher pressures use the resultant collision of sample molecules with ionized reagent gas molecules as a means of ionizing the sample molecules. Such operation will produce a mixture of positive and negative ions, electron and neutral particles.

In FIG. 2, a mass spectrometer 1 is exemplified here by an ion trap mass spectrometer. The mass spectrometer 1, in this embodiment, includes a ring electrode 3 and two end electrodes 4 and 5 facing each other. Together, the three electrodes form a trap region 2 for storing ions. The size of the trap region may be varied by changing $r_0$ 7 (the distance from the center of the ion trap to an apex of the ring electrode 3), $z_0$ 6 (the distance from the center of the ion trap to an apex of either end electrode 4 or 5), or a combination of $r_0$ or $z_0$. Other suitable ion trap configurations are shown and described in co-pending application No. 08/250,156 filed May 27, 1994, which is incorporated herein by reference.

A focusing lens system comprising focusing lens 51, 52, and 53 can be used to gate sample ions 16 out of ion source 156 through aperture 34 in the direction of arrow 17. The gated ions then enter a trap region 2 through entrance 18 of the mass spectrometer 1.

In FIG. 2, the ion source 156 comprises an ion chamber 50, an ion volume 58, and a filament 65. Other ionization methods use different configurations to form ions. In FIG. 2, gas molecules in the ion source 156 are ionized by electron beams emitted from a filament 65 controlled by a programmable filament emission regulator and bias supply 54. Ions are continuously created in an ion volume 58 of the ion source 156. In order to gate or introduce at least a portion of the sample ions into the mass spectrometer 1, a focusing lens system comprising lens 51, 52, and 53 is placed between the ion source 156 and the mass spectrometer's entrance 18. Various well-known methods exist to gate the ions into the mass spectrometer. Essentally, differential voltages among the lens 51, 52, and 53 set up by programmable lens voltage supplies 55, 56, and 57, respectively, dictate when and how many ions are gated into the mass spectrometer 1. An instrument control and data acquisition processor 91 sends addressed control signals to the fast switching programmable lens voltage supply 56 via a digital instrument control bus 130 to change voltages and thus, gate ions into the mass spectrometer for a predetermined period of time (e.g., 100 ms). Since the rate at which sample ions are transferred is fairly constant, the gating time determines the quantity of sample ions introduced into the mass spectrometer.

Before any sample ions are introduced into the mass spectrometer, a substantially quadrupole field is established and maintained in the mass spectrometer as described below. Several well-known techniques may be used to establish such a substantially quadrupole field.

Programmable DC voltage supply 70 provides a DC voltage to the electrode 3. This DC voltage is applied to each electrode via identical center tapped transformer 71.

To establish and maintain a sufficiently uniform RF voltage component of the substantially quadrupole field, a common frequency reference 94 is provided. An integer multiple of this frequency is then generated by a programmable sinewave synthesizer 78 to further generate a sinusoidal component of the RF voltage at new frequency f. For the amplitude portion (V) of the sine wave, an addressed signal from the instrument control and data acquisition processor 91 is sent to a 16-bit digital-to-analog converter 77. This amplitude (V) in analog form is then multiplied via a multiplier 79 with the sinusoidal component of the RF voltage to create an unamplified RF voltage. An RF power amplifier 84 amplifies this unamplified RF voltage to a level sufficient enough to trap ions in the trap region. This amplified RF voltage is then applied to the electrode 3 via transformer 83.

The applied voltage provides a field for trapping ions in the trap region 2. The field is a substantially quadrupole field in the trap region 2 of the mass spectrometer 1 which leads to the stability diagram of FIG. 3.

Figure 3:
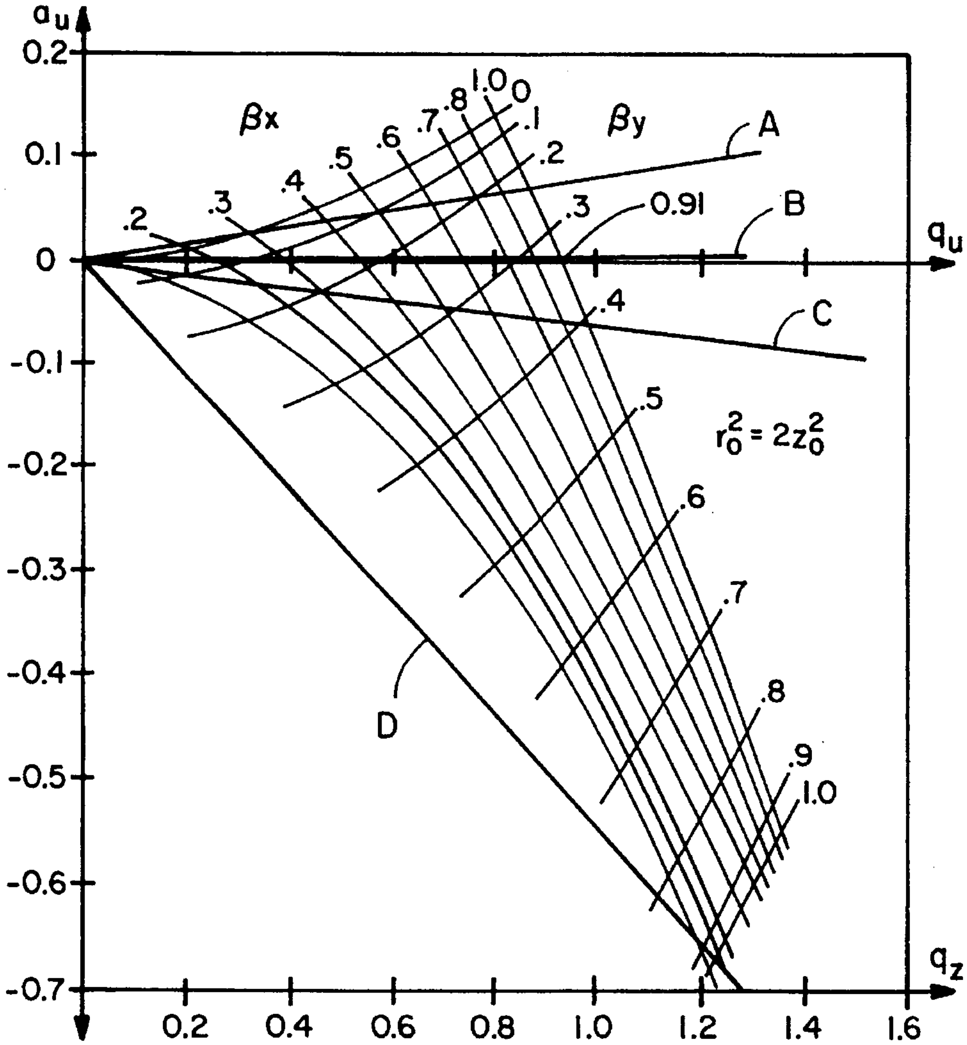
FIG. 3 is a stability diagram for a substantially quadrupole field formed by the mass spectrometer of FIG. 2.

Stability diagrams, such as that of FIG. 3, represent a graphical illustration of the solutions of the Mathieu equation use $a_u$ as the ordinate and $q_u$ as the abscissa. For a substantially quadrupole field defined by U, V, $r_0$ and ω the locus of all possible m/e ratios maps onto the stability diagram as a single straight line running through the origin with a slope equal to −2 U/V. This locus is also referred to as the scan operating line. That portion of the locus of all possible m/e ratios which maps within the stability region defines the range of m/e ratios ions may have if they are to be trapped in the applied field.

FIG. 3 shows a stability diagram representative of the operation of a mass spectrometer. Knowledge of the diagram is important to the understanding of the operation of mass spectrometers. The stable region is shown bounded by $\beta_x$=0, $\beta_x$=1.0, $\beta_y$=0, and $\beta_y$=1.0. Any β value within this region provides stable solutions to the Mathieu equation. Any point outside or on the β boundaries is unstable.

The sample ion masses that can be trapped depend on the numerical values of the scanning parameters U, V, $r_0$, and ω. The relationship of the scanning parameters to the ratio m/e of the sample ions that are trapped is described in terms of the parameters a and q in FIG. 3. The type of trajectory a charged ion has in a substantially quadrupole field depends on how the specific ratio m/e of the sample ion and the applied field parameters, U, V, $r_0$ and ω combine to map onto the stability diagram. If these scanning parameters combine to map inside the stability region then the given ion has a stable trajectory in the defined field. By properly choosing the magnitudes of U and V, the range of specific masses of trappable ions can be selected. If the ratio of U to V is chosen so that the locus of possible specific masses maps through an apex of the stability region, then only ions within a very narrow range of specific masses will have stable trajectories. However, if the ratio of U to V is chosen so that the locus of possible specific masses maps through the middle of the stability region, then ions of a broad range of specific masses will have stable trajectories. Ions having a stable trajectory in a substantially quadrupole field is constrained to an aperiodic orbit about the center of the field. Such ions can be thought of as being trapped by the field.

If, for an ion m/e ratio, U, V, $r_0$, and ω combine to map outside the stability region on the stability diagram, then the given ion has an unstable trajectory in the defined field. Ions having unstable trajectories in a substantially quadrupole field attain displacements from the center of the field which approach infinity over time. Such ions can be thought of as escaping the field and are consequently considered untrappable.

The other mode of operation, the ion storage mode, relates more to typical MS techniques where, in the Mathieu curves, a designated normal scanning line selects ions of only one mass at a time. That is, the other ions are unstable and untrappable. Then a voltage pulse is applied between the end caps and the trapped stable ions are ejected out of the storage region to a detector. To select a given mass-to-charge (m/e) ratio, the appropriate voltages, V and U, and frequency f must be applied.

To keep the RF amplitude stable, and thus control the ion content of in the ion trap mass spectrometer, various well-known methods for correcting RF amplitude variance may be used. In the circuit diagram of FIG. 2, one method is shown. A feedback loop comprising RF detector capacitors 73 and 74, an RF amplitude detection circuit 75, and an error amplifier 76 provide RF amplitude variance correction. The amplitude of the RF voltage at the output of the RF amplitude detection circuit 75 is used as one of two input voltage signals to the error amplifier 76. One input, the amplitude reference from the digital-to-analog converter 77, is the desired RF amplitude. The other input, the detected RF amplitude from the RF amplitude detection circuit 75, is the deviating and undesired RF amplitude. The error amplifier 76 then outputs an amplitude value representing the difference of the two input voltages. This differential amplitude is then applied to the electrodes by adding or subtracting from the existing RF voltage.

Ejected ions leave the trap region 2 through perforation 25 on end electrode 5, through exit lens 95, and become captured and converted in a dynode 92. Secondary emissions of particles occur where the particles are collected and multiplied by a multichannel electron multiplier 93. The dynode 92 is powered by a power supply 89 (15 kV is not uncommon) and the multichannel electron multiplier 93 is powered by a high voltage power supply (3 kV is not uncommon) 94.

A detector, comprising a multiplier 93 in this embodiment, is a transducer that converts electromagnetic radiation into an electron flow and, subsequently, into a current flow or voltage in the readout circuit. Many times the photocurrent requires amplification, particularly when measuring low levels of radiant energy. There are single-element detectors such as solid-state photodiodes, photoemissive tubes, and photomultiplier tubes, and multiple-element detectors such as solid-state array detectors. FIG. 2 shows one type of detector, an electron multiplier 93 commonly known in the art. Other detectors that could be employed including a Faraday collector or a microchannel plate detector.

At the output of the multichannel electron multiplier 93 is an ion current signal whose magnitude is representative of the amount of the detected ions. This ion current is converted into a voltage signal by electrometer 90. The resulting voltage signal is converted into digital form by digital-to-analog converter 99. The digital signal, representative of the detected ions' mass, is then entered into the instrument control and data acquisition processor 91.

The accumulation of similarly charged particles in any device is a source of space charge and saturation which leads ultimately to perturbation of the properties of the sample ions. In analytical instruments, the effects of space charge lead to saturation of detector response as ion-ion repulsion becomes significant.

In accordance with an embodiment of the invention, an ion content controller, or an automatic ion supply control feature, is used to control the number of sample ions introduced into the mass spectrometer to minimize saturation and space change and improve detection limits. Additionally, dynamic range may also improve with feedback. Simply stated, an initial preselected gating time will result in a certain number of sample ions being gated into the mass spectrometer. When an initial scan, called a pre-scan, is conducted of this set of gated sample ions, a total ion content information is determined. This information is fed back to a computer which then determines whether this total ion content is too little or too much. Based on this information, a new gating time will be used to adjust the number of sample ions gated into the mass spectrometer. All subsequent gate times will be adjusted according to all past gate times used.

More specifically, a preferred embodiment of the invention is as follows. Based on a combination of voltages applied by the programmable lens voltage supplies 55 and 57 and fast switching programmable lens voltage supply 56 to the focusing lens 51, 53, and 52, respectively, an estimated number of sample ions are gated from the continuous ion source 156 into the mass spectrometer 1 substantially in a direction indicated by arrow 17 through entrance 18 on end electrode 4. This number of ions may be gated by turning "on" (i.e., changing the voltage) the focusing lens 52 for a specified preselected time. A typical initial gate time would be 100 microseconds. A different number of sample ions may be gated into the mass spectrometer by using a different gate time.

Since the mass spectrometer has already established and maintained a substantially quadrupole field within its trap region 2, most sample ions entering the mass spectrometer are trapped and behave as predicted according to well-known principles in the art. As sample ions are ejected out of the mass spectrometer 1 through perforation 25 during a pre-scan, the total ion content information is determined by the instrument control and data acquisition processor 91. Based on an algorithm stored in a computer 150, a new gate time is calculated to substantially optimize the number of sample ions gated into the mass spectrometer during the next gate sequence.

In the next gate sequence, the instrument control and data acquisition processor 91 sends control signals on bus 130 to the fast switching programmable lens voltage supply 56. The control signals are used to control the length of the next ion gating time and hence, the number of sample ions. The fast switching programmable lens voltage supply 56 applies a voltage to focusing lens 52 to set up a differential potential across the focusing lens system and "open" the lens for an adjusted gate time. After the sample ions are gated into the mass spectrometer for a certain gate time, the programmable lens voltage supply 56 "closes" the lens by either turning off or applying a different voltage to stop the transfer of sample ions from the continuous ion source 156 into the mass spectrometer 1. After mass analysis, a new total ion content information is obtained and, as before, the information is fed back into the instrument control and data acquisition processor 91. The computer 150 uses this data to set up a new gate time for the next gate sequence. The above sequence is repeated until the sample molecules of interest are depleted in the continuous ion source.

Note that although the ion source 156 may be continuous, that is, ions may be continuously formed in the ion source, the mass analysis step of the mass spectrometer is not continuous. Mass analysis or scanning occurs only after a set of sample ions, based on a designated gate time, are gated into the mass spectrometer.

Where the ion source is not an ionization cell, the same principle of controlling the gating time to control the amount of ions gated into the mass spectrometer applies. For example, if the external ionization method is electrospray ionization, focusing lens will still be used to gate ions from the ion source into the mass spectrometer. See U.S. Pat. No. 5,122,670 issued to Mylchreest and assigned to Finnigan Corporation.

Figure 5:
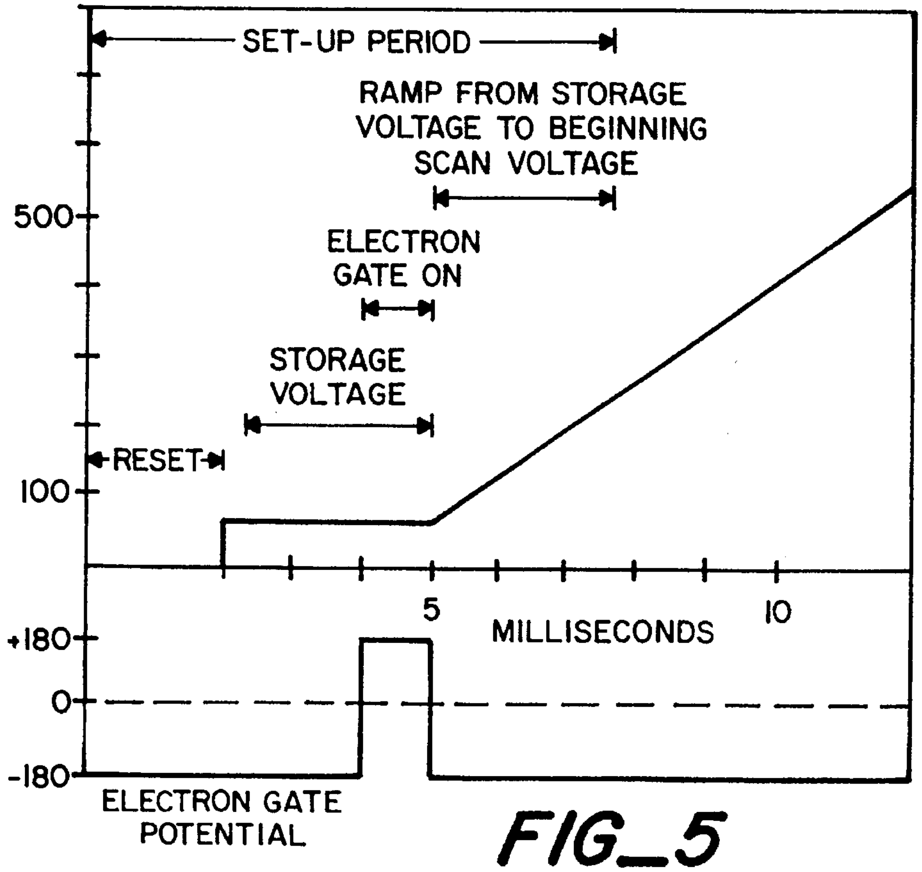
FIG. 5 shows timing diagrams illustrating the operation of the mass spectrometer as a scanning mass spectrometer.

The mass spectrometer, filament, electron multiplier, and focusing lens are operated under vacuum. The optimum pressure range of operation is about $1\times10^{-3}$ torr of suitable gas within the ion storage region and exterior thereto about $1\times10^{-4}$ torr. Initially, prior to gating of any sample ions, the electrodes comprising the mass spectrometer are operated at zero or very low RF voltage to clear the mass spectrometer of all ions, a trapping RF voltage is then applied, and when the substantially quadrupole field is established the focusing lens system allows sample ions to enter the mass spectrometer. All ions which have a q on the stability diagram below about 0.91 are stored. Following this, the RF field is ramped to a beginning scan voltage. The ramp rate is then changed and the trapped sample ions are expelled by the increasing RF voltage. The foregoing sequence of operation is shown in FIG. 5.

Figure 4:
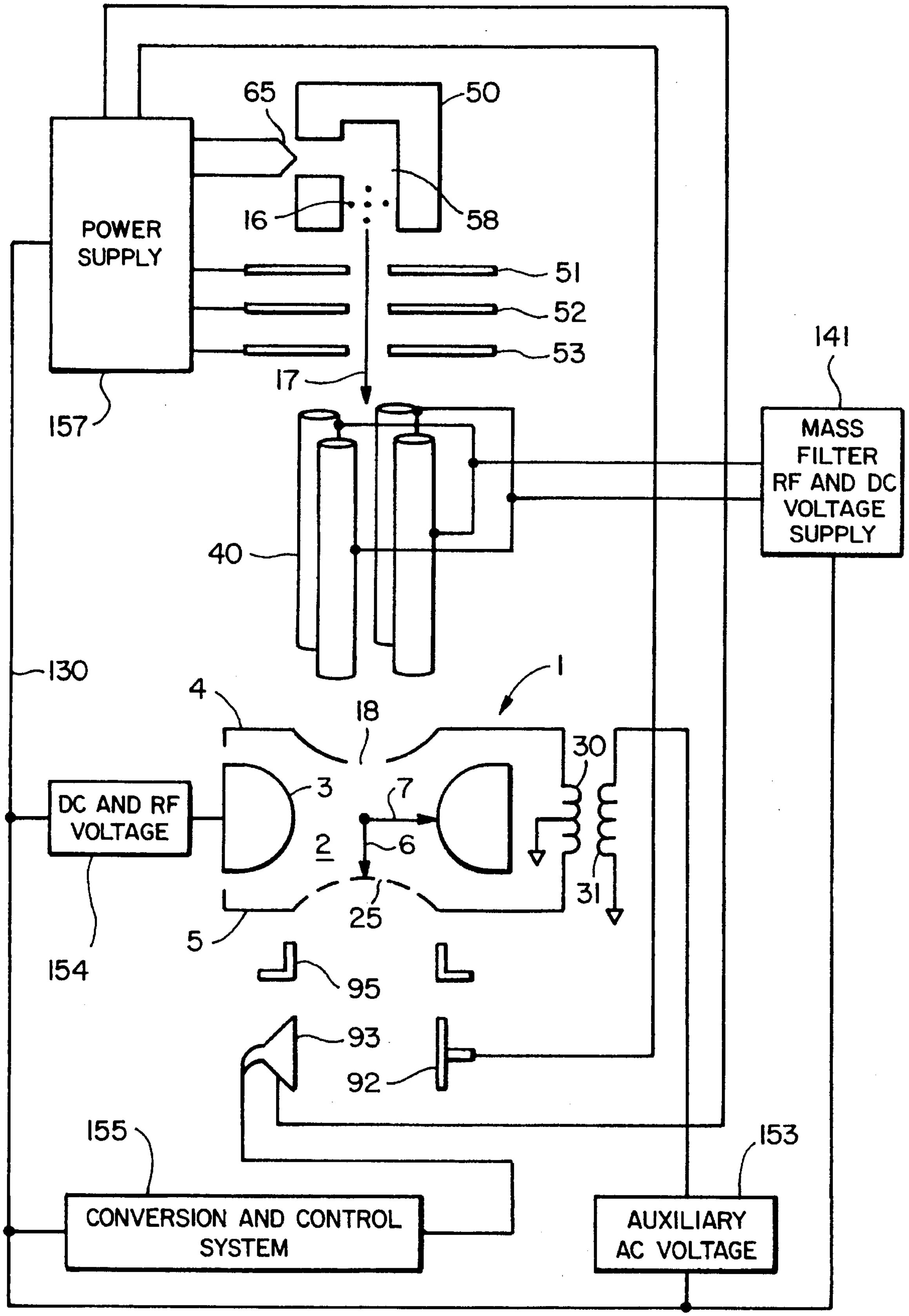
FIG. 4 shows a relevant portion of the circuit of FIG. 2 in another embodiment of the invention where a mass filter in the form of a quadrupole is configured between the ion source and the mass spectrometer.
Figure 6:
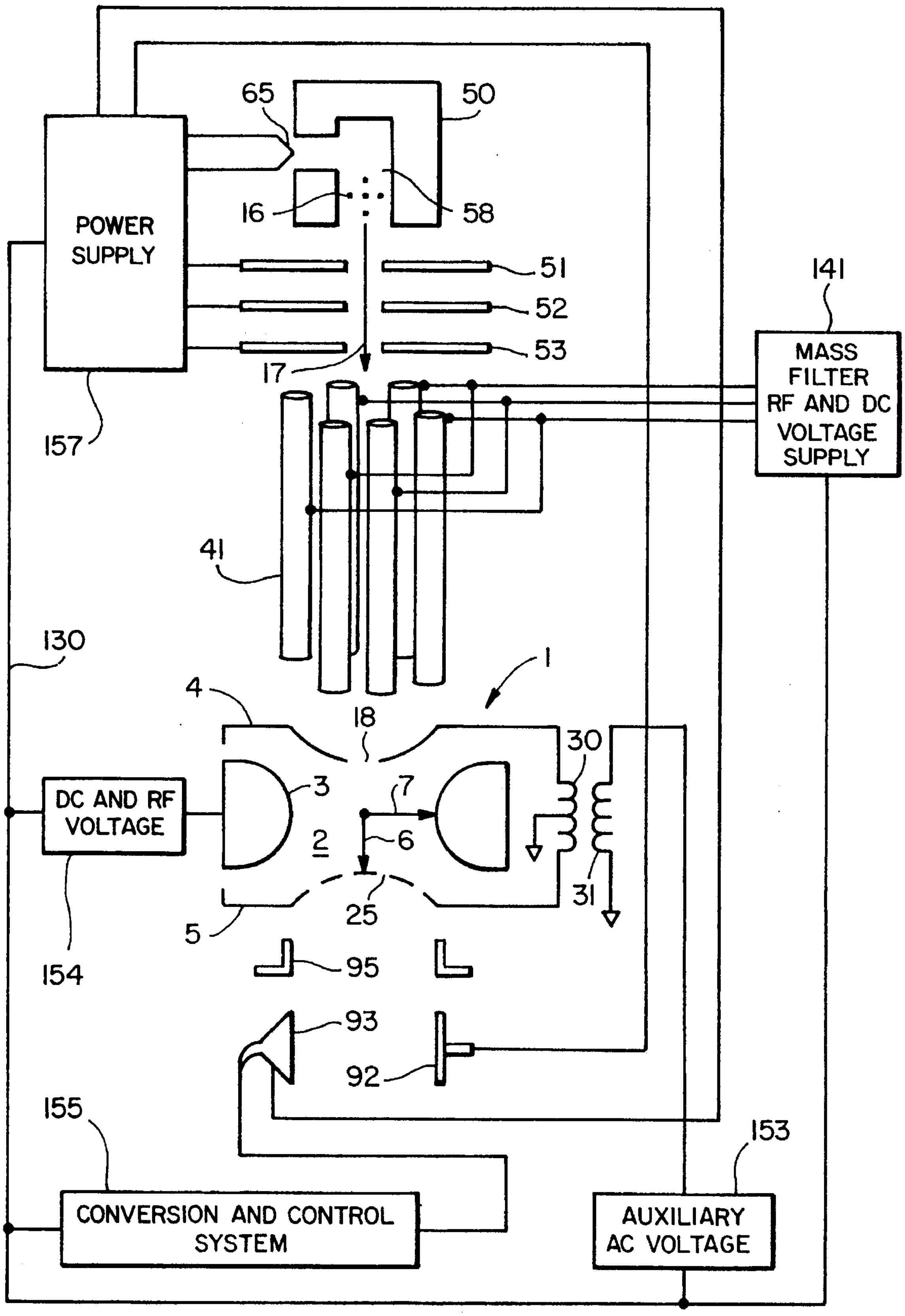
FIG. 6 shows a relevant portion of the circuit of FIG. 2 in another embodiment of the invention where a mass filter in the form of a hexapole is configured between the ion source and the mass spectrometer.
Figure 7:
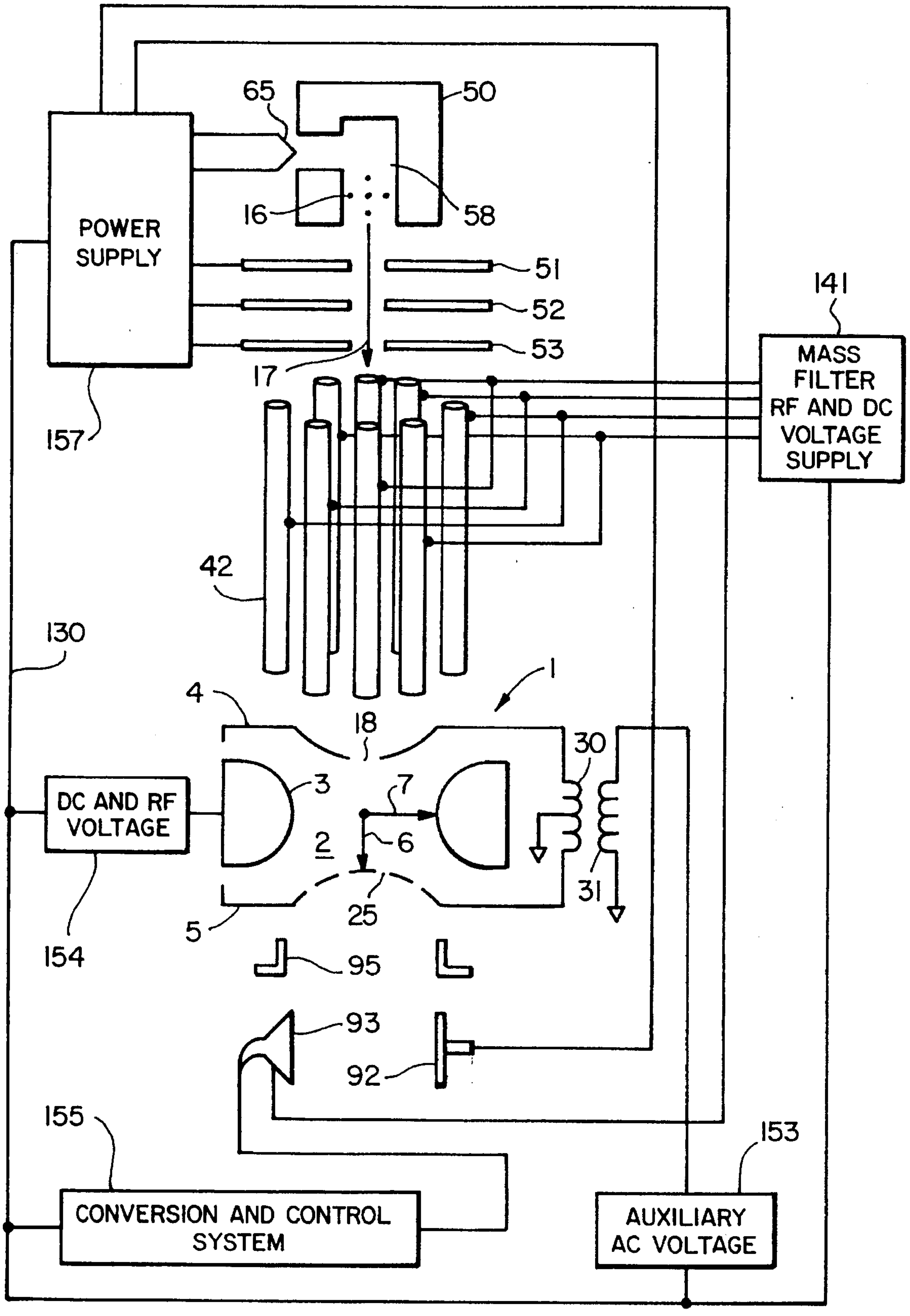
FIG. 7 shows a relevant portion of the circuit of FIG. 2 in another embodiment of the invention where a mass filter in the form of a quadrupole is configured between the ion source and the mass spectrometer.

In yet another embodiment shown in FIG. 4, a portion of the circuit of FIG. 2 shows how an RF multipole mass filter 40 may be configured between the focusing lens system 51, 52, and 53 and the mass spectrometer 1. The circuitry 141 for this mass filter is well-known in the art and may be configured like that of DC and RF voltage source 154 of FIG. 2. In FIG. 4, the RF multipole is a quadrupole. In this manner, only those sample ions within the desired mass-to-charge (m/e) ratio will pass through the mass filter 40 and into the mass spectrometer 1 for further analysis. Once again, the scan operating line (determined by the particular values or sets of values for U, V, and ω) determine which ions of specific m/e will be stable and pass through to the mass spectrometer 1. By introducing more of the desired sample ions of interest, an improvement in the signal-to-noise ratio will result. With the addition of a mass filter 40 which potentially reduces the total number of ions introduced into the mass spectrometer 1, the algorithm in the computer may be modified to compensate for the lower number of sample ions; that is, more sample ions may need to be gated into the mass filter so that the number of ions in the mass spectrometer is at an acceptable level for analysis. This should result in faster processing time since more ions are gated into the mass filter at any single gate sequence. The RF multipole of the mass filter could be a quadrupole (FIG. 4), a hexapole 41 of FIG. 6, an octopole 42 of FIG. 7, or any equivalent thereof.

In another embodiment, the mass analyzing system will employ mass spectrometers with novel geometries for improved performance. The novel geometries are disclosed in a co-pending patent application and incorporated herein by reference. The novel geometries disclose an elongated structure to form an elongated trapping volume.

In one embodiment, the present mass spectrometer operates as a mass spectrometer based on mass selective instability, as disclosed in U.S. Pat. No. 4,540,884 and incorporated herein by reference. In general, the method is as follows: DC and RF voltages (U and Vcosωt) are applied to an electrode structure to create a substantially quadrupole field such that ions over the entire specific mass range of interest are trapped within a trap region. Ions are then either formed or introduced into the trap region by any one of a variety of well-known techniques. After this storage period, U, V, and ω are varied either in combination or singly so that trapped ions of specific masses become unstable. As the selected trapped ion become unstable, they develop trajectories that exceed the boundaries of the trap region. These ions pass out of the trap region through perforations in the field imposing electrode structure and impinge on a detector such as an electron multiplier 93 (of FIG. 2) or a Faraday collector. The detected ion current signal intensity as a function of time corresponds to a mass spectra of the ions that were initially trapped.

Another effective ion ejection method is resonance ejection especially when it is used with another method of mass analysis. Refer to U.S. Pat. Nos. 4,736,101 and RE34,000. They demonstrate that introducing a second AC field in the mass spectrometer facilitates the separation of a group of ions. Such a field causes ions to oscillate at a certain amplitude. The amplitude determines whether the ion will hit the electrode surfaces, remain stable in the trap region, or will pass through to the detector. The magnitude of the second AC voltage source determines the amplitude of ion oscillation. The frequency of the second AC source determines which group of ions will be selectively forced to oscillate. This process improves the resolution by "filtering out" undesired ions; that is, it could be used as a notch filter.

The auxiliary field merely increases the amplitude of ion motion. The frequency of the auxiliary field can be selected to match the fundamental, or resonance, frequency of ion motion. At resonance, the amplitude of ion motion for the ion of interest increases linearly, thus rendering those ions unstable. At a certain amplitude of motion, the ions will strike the sides of the device. The auxiliary field creates a dip at the mass number of the resonating ions. In essence, the auxiliary field improves resolution by selectively diminishing adjacent peaks by making ions with a certain mass unstable.

In contrast to ion motion in the unstable region of the stability diagram, the amplitude of ion oscillations due to the auxiliary field at resonance increase linearly with time. The amplitude of oscillation of ions in the unstable regions of the stability diagram increases exponentially.

When the frequency of the auxiliary field is not at resonance, a series of beats of frequencies representing the differences and summations of the frequencies of the two AC sources are generated. The amplitude of ion motion due to the beats is proportional to the magnitude of the auxiliary field and becomes greater as the frequency approaches resonance. If the difference in mass between two ions is small, the beat amplitude will be large. A smaller auxiliary field reduces the beat amplitudes. To be effective, the beat amplitude must be maintained at less than the instrument radius $r_0$. In a typical application, the frequency of the auxiliary field will be chosen to be equal to the resonance or fundamental frequency of the ion to be eliminated. In other applications, several resonance auxiliary fields may be used simultaneously, each corresponding to a resonance frequency of one of the ions to be removed. Because this technique uses oscillation of ions, the selection of the frequencies of both fields depends on the ion's mass.

Another method of ejecting ions out of the mass spectrometer and into a detector is MS/MS, coined and described in U.S. Pat. Nos. 4,736,101 and RE34,000, which are incorporated herein by reference. Essentially, MS/MS involves the use of at least two distinct mass spectrometry steps. First, scanning parameter RF (and possibly DC) voltage is adjusted to trap ions (parent ions) within a desired m/e range. After undesired ions are ejected, the RF (and possibly DC) voltage was lowered to readjust the m/e range of interest and including lower m/e ions. Fragments, or product ions, are then formed when a neutral gas, such as argon or xenon, are introduced in the trap region. These fragments remain in the trap region, or within the stable region of FIG. 3. Second, the RF (and possibly DC) voltage was increased to eject the fragment ions into a detector. Thus, at least two mass spectrometry steps were performed in one device. Repetitive tandem MS techniques (i.e. $(MS)^n$) may also be employed for n distinct mass spectrometry steps.

Furthermore, a supplemental AC field, superimposed on the existing RF field, may be applied to provide various scan modes for mass detection as well as to dissociate the ions. In one embodiment, a supplemental AC field may be applied after the primary RF field was decreased after the first scan and prior to the second scan of the primary RF field to eject undesired ions of a specific m/e ratio. Upon ejection, the supplemental AC field is turned off and the primary RF field may be increased to eject desired ions into a detector.

Variations of this technique, as disclosed in U.S. Pat. Nos. 4,736,101 and RE34,000, may be used. For example, the supplemental AC field may be turned on during the second scan of the primary RF field. Alternatively, instead of a second scan period, the RF field is kept constant while the frequency of the supplemental AC field is varied.

The supplemental AC field portion of the mass analyzing system is shown in FIGS. 2, 4, 6 and 7. In FIG. 2, a programmable sine wave synthesizer 35 provides a sinusoidal output at frequency $f_{supp}$ based on the common frequency reference 94. The 16-bit digital-to-analog converter 34 converts a digital representation of the amplitude from instrument control and data acquisition processor 91 into analog form. the two signals, the sine wave signal and the amplitude signal, are multiplied by multiplier 33. The resulting output is amplified by amplifier 32 and coupled to end electrodes 4 and 5 by transformers 30 and 31. The amplitude may be controlled by the instrument control and data acquisition processor 91 as it sends appropriate signals to 16-bit digital-to-analog converter 34. If desired, the frequency of the supplemental AC field $f_{supp}$ may be varied by programmable sine wave synthesizer 35 through appropriate control signals from instrument control and data acquisition processor 91.

Figure 8:
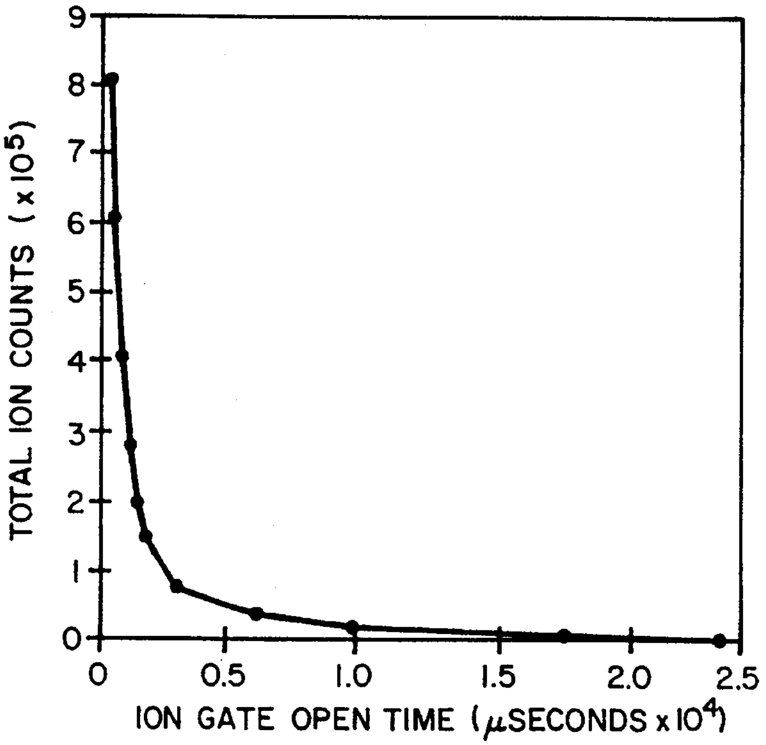
FIG. 8 shows a plot of total ion counts v. ion gate time when using an embodiment of this invention.

FIG. 8 shows a plot of total ion counts vs. ion gate time when using an embodiment of the invention. In this plot, the computer scaled the data to reflect the change in ion abundance. As demonstrated by the plot, the automatic ion supply control feature of the invention provides variable ionization time. As total ions increase, less ions are gated into the mass spectrometer (via lower gate times). When less ions are present in the mass spectrometer, the automatic ion supply control increases the ion gate time to introduce more ions into the mass spectrometer.

Figure 9:
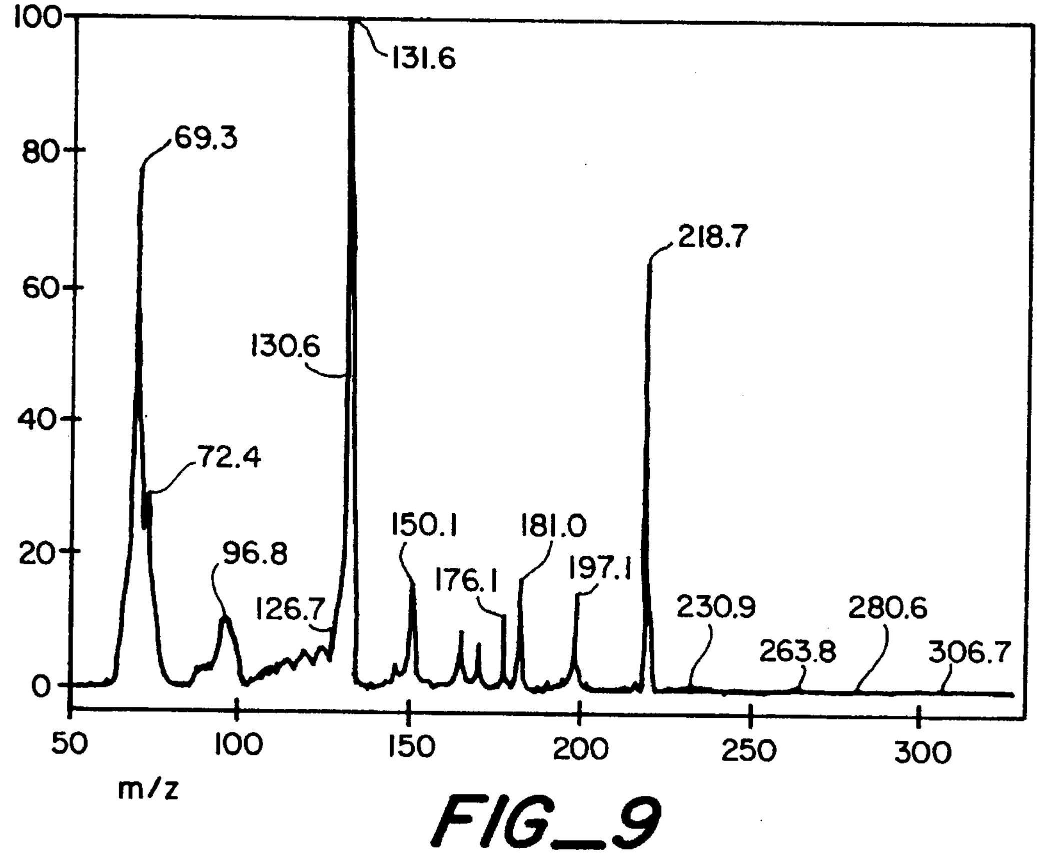
FIG. 9 shows a mass spectral plot when the automatic ion supply control feature is not used and space charge effects detrimentally affect the data.
Figure 10:
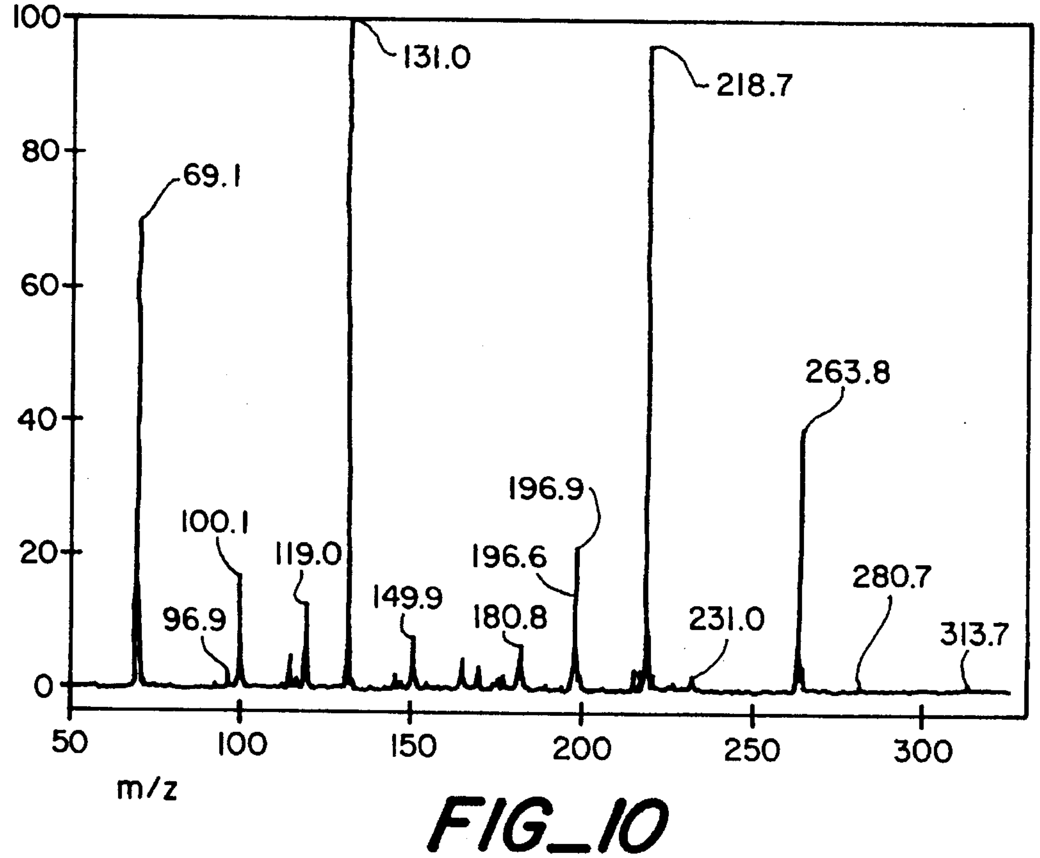
FIG. 10 shows a mass spectral plot when an embodiment of the invention is used and the data is not affected by space charge effects.

In the experiment of FIGS. 9–10, the sample compound used is FC43 (or perfluoro-tributyl-amine). Common fragments of the sample compound are found at $\mathbf{69^+}$, $\mathbf{100^+}$, $\mathbf{119^+}$, $\mathbf{131^+}$, $\mathbf{150^+}$, $\mathbf{219^+}$, $\mathbf{264^+}$, $\mathbf{414^+}$, $\mathbf{502^+}$, and $\mathbf{614^+}$. The set-up is similar to the embodiment of FIG. 7. The ion source 50 is at 0 V (GND), lens 51 is at −10 V, lens 52 is at −100 V, and lens 53 is at either −20 V (ON) or +140 V (OFF). The RF magnitude of the octopole 42 is at 250 $V_{peak\text{-}to\text{-}peak}$ and its offset is −3 V. The offset of the mass spectrometer 1 is at −4.2 V. The exit lens 95 is at 0 V. The dynode 93 is at −15 kV and the electron multiplier is at −1800 V.

When the automatic ion supply control feature is not used in a mass spectrometer incorporating external ionization, sample saturation and space charge effects may detrimentally affect the data and promote the loss of mass resolution and sensitivity and errors in mass assignment. FIG. 9 shows a mass spectral plot when the automatic ion supply control feature is not used and the ionization time was 10 ms. The mass spectral quality degrades and result in lower resolution (m/Δm), a loss of peak height reducing the signal-to-noise ratio, and/or a change in the measured relative ion abundances. Mass assignment errors also occur. In contrast, FIG. 10 shows a mass spectral plot when the automatic ion supply control feature is used and the variable ionization or gate time resulted in an average ionization or gate time of 0.2 ms. In FIG. 10, the resolution is much improved over the plot of FIG. 9 and degradation is significantly reduced.

Although this invention has been described with reference to a particular embodiment, additional embodiments, applications, and modifications that are obvious to those skilled in the art or are equivalent to the disclosure are included within the spirit and scope of the invention. Therefore, this invention should not be limited to the specific embodiment discussed and illustrated herein, but rather by the following claims and equivalents thereof.

What is claimed is:

1. A method of mass analysis comprising the steps of:

(a) forming sample ions in a source external to a mass spectrometer;

(b) establishing and maintaining a trapping field in a trap region of a mass spectrometer to store ions whose mass-to-charge ratios lie within a predetermined range of mass-to-charge ratios:

(c) transferring ions from said source into the mass spectrometer for a predetermined time;

(d) removing the transferred sample ions from the mass spectrometer into a detector;

(e) measuring total ion content of the transferred sample ions to develop an ion content signal;

(f) receiving the ion content signal and comparing the ion content with a predetermined ideal ion content to develop a control signal; and (g) controlling the time in which sample ions are subsequently transferred into the mass spectrometer from the ion source in response to the control signal to control saturation and space charge in the mass spectrometer.

2. A method of mass analysis as in claim 1 further comprising the step:

(g) providing an output signal indicative of the removed sample ion's corresponding mass.

3. A method of claim 1 wherein the removal step is achieved by varying the substantially quadrupole field in the mass spectrometer so that at least a portion of the transferred sample ions in the mass spectrometer become unstable and leave the substantially quadrupole field.

4. A method of claim 1 further comprising the step of filtering sample ions of specific masses as the sample ions are transferred into the mass spectrometer to provide ions within a desired mass-to-charge ratio.

5. A method of claim 1 wherein the step of removing sample ions from the mass spectrometer into a detector further includes the steps:

adjusting the substantially quadrupole field to be able to trap product ions of the transferred sample ions in the trap region of the mass spectrometer;

dissociating or reacting remaining transferred sample ions with a neutral gas to form product ions; and changing the substantially quadrupole field to remove, for detection, ions whose mass-to-charge ratios lie within a desired range of mass-to-charge ratios.

6. A method of claim 1 wherein the step of removing sample ions from the mass spectrometer into a detector further includes the steps:

adjusting the substantially quadrupole field to be able to trap product ions of the transferred sample ions in the trap region of the mass spectrometer;

dissociating or reacting remaining transferred sample ions with a neutral gas to form product ions;

applying a primary supplemental AC field of frequency $f_{res}$ to a set of electrodes, where $f_{res}=kf\pm f_u$ k=integer where k={0, ±1, ±2, ±3, . . . } f=frequency of the RF component of the substantially quadrupole field $f_u$=fundamental frequency for the secular motion of a given ion at $q_{u\ eject}$ along the u coordinate axis, and $f_u<f$, the primary supplemental AC field superimposed on the substantially quadrupole field to form a combined field so that trapped ions of specific mass-to-charge ratios develop unstable trajectories that cause them to leave the trap region of the mass spectrometer; and changing the combined field to remove, for detection, ions whose mass-to-charge ratios lie within a desired range of mass-to-charge ratios.

7. A method of claim 6 wherein the combined field is changed by scanning the frequency of the supplemental AC field while keeping the magnitude of the substantially quadrupole field constant.

8. A method of claim 6 wherein the combined field is changed by scanning the magnitude of the substantially quadrupole field while keeping the magnitude of the supplemental field constant at a non-zero level.

9. A method of claim 8 wherein the frequency of the supplemental field is kept constant.

10. A method of claim 6 wherein the combined field is changed by changing the magnitude of the primary supplemental AC field while changing the amplitude of the RF component of the substantially quadrupole field.

* * * * *